United States Patent
Millet et al.

(10) Patent No.: US 10,079,019 B2
(45) Date of Patent: Sep. 18, 2018

(54) ALWAYS-ON AUDIO CONTROL FOR MOBILE DEVICE

(71) Applicant: Apple Inc., Cupertino, CA (US)

(72) Inventors: Timothy J. Millet, Mountain View, CA (US); Manu Gulati, Saratoga, CA (US); Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 14/109,101

(22) Filed: Dec. 17, 2013

(65) Prior Publication Data
US 2015/0134331 A1 May 14, 2015

Related U.S. Application Data

(60) Provisional application No. 61/903,002, filed on Nov. 12, 2013.

(51) Int. Cl.
*G10L 15/22* (2006.01)
*G10L 15/28* (2013.01)
(Continued)

(52) U.S. Cl.
CPC ............ *G10L 15/28* (2013.01); *G06F 1/32* (2013.01); *G06F 1/3228* (2013.01);
(Continued)

(58) Field of Classification Search
CPC .......... H04R 29/004; H04R 1/08; G10L 17/22
(Continued)

(56) References Cited

U.S. PATENT DOCUMENTS 5,461,588 A * 10/1995 Sardeson ............... G11C 29/52
   365/201
5,615,296 A   3/1997 Stanford et al.
(Continued)

FOREIGN PATENT DOCUMENTS

CN   102037428 A   4/2011
CN   104247280 A   12/2014
(Continued)

OTHER PUBLICATIONS

"The Jigsaw Continuous Sensing Engine for Mobile Phone Applications", Hong Lu et al., Nov. 3-5, 2010, pp. 1-14.
(Continued)

*Primary Examiner* — Shreyans A Patel
(74) *Attorney, Agent, or Firm* — Meyertons, Hood, Kivlin, Kowert & Goetzel, P.C.; Lawrence J. Merkel

(57) ABSTRACT

In an embodiment, an integrated circuit may include one or more CPUs, a memory controller, and a circuit configured to remain powered on when the rest of the SOC is powered down. The circuit may be configured to receive audio samples from a microphone, and match those audio samples against a predetermined pattern to detect a possible command from a user of the device that includes the SOC. In response to detecting the predetermined pattern, the circuit may cause the memory controller to power up so that audio samples may be stored in the memory to which the memory controller is coupled. The circuit may also cause the CPUs to be powered on and initialized, and the operating system (OS) may boot. During the time that the CPUs are initializing and the OS is booting, the circuit and the memory may be capturing the audio samples.

16 Claims, 4 Drawing Sheets

(51) Int. Cl.
*G06F 3/16* (2006.01)
*G06F 1/32* (2006.01)
*G10L 15/08* (2006.01)
*G10L 25/48* (2013.01)

(52) U.S. Cl.
CPC ............ *G06F 1/3287* (2013.01); *G06F 3/165* (2013.01); *G10L 15/22* (2013.01); *G10L 25/48* (2013.01); *G10L 2015/088* (2013.01); *Y02D 10/171* (2018.01)

(58) Field of Classification Search
USPC ......................................................... 704/243
See application file for complete search history.

(56) References Cited

U.S. PATENT DOCUMENTS

| | | | |
|---|---|---|---|
| 5,774,841 A * | 6/1998 | Salazar | G10L 15/22 704/225 |
| 5,983,186 A | 11/1999 | Miyazawa et al. | |
| 6,408,396 B1 * | 6/2002 | Forbes | G06F 3/165 713/323 |
| 7,774,204 B2 | 8/2010 | Mozer et al. | |
| 8,078,800 B2 | 12/2011 | Moallem et al. | |
| 8,117,475 B2 | 2/2012 | Pesavento et al. | |
| 8,768,707 B2 | 7/2014 | Mozer | |
| 2009/0292934 A1 * | 11/2009 | Esliger | G06F 1/3203 713/323 |
| 2009/0300386 A1 * | 12/2009 | Archer | G06F 1/3203 713/320 |
| 2010/0312971 A1 * | 12/2010 | Moallem | G06F 1/3203 711/135 |
| 2011/0291801 A1 * | 12/2011 | Sommer et al. | 340/8.1 |
| 2012/0102347 A1 * | 4/2012 | Hobson | G06F 1/3287 713/323 |
| 2013/0080167 A1 | 3/2013 | Mozer | |
| 2013/0129114 A1 | 5/2013 | Lesso | |
| 2013/0223635 A1 | 8/2013 | Singer et al. | |
| 2013/0225238 A1 | 8/2013 | He | |
| 2014/0077849 A1 | 3/2014 | Chen | |
| 2014/0179298 A1 | 6/2014 | Grokop et al. | |
| 2014/0218372 A1 | 8/2014 | Missig et al. | |
| 2014/0222436 A1 | 8/2014 | Binder | |
| 2014/0257813 A1 | 9/2014 | Mortensen | |
| 2014/0281625 A1 | 9/2014 | Younger | |
| 2015/0066438 A1 | 3/2015 | Brooks | |
| 2015/0205342 A1 * | 7/2015 | Ooi | G06F 1/3231 713/323 |
| 2015/0245154 A1 * | 8/2015 | Dadu | G06F 3/167 381/56 |
| 2015/0301557 A1 | 10/2015 | Walker | |

FOREIGN PATENT DOCUMENTS

| | | |
|---|---|---|
| JP | 2003189165 A1 | 7/2003 |
| JP | 200323252 A1 | 2/2009 |
| KR | 10-2011-0021927 | 3/2011 |
| WO | 2013085507 A1 | 6/2013 |
| WO | 2013163113 A1 | 10/2013 |
| WO | 2015005927 A1 | 1/2015 |

OTHER PUBLICATIONS

"How to Get Started With Hands-Free Control on the Moto X", Nick Mediati, Sep. 9, 2013, pp. 1-4.
International Search Report and Written Opinion from PCT/US2014/057958, dated Dec. 12, 2014, Apple Inc., pp. 1-13.
"Use Voice Commands from the Samsung Galaxy S3 Lock Screen", Nicole Cozma, Oct. 15, 2012, pp. 1-11.
"How the Samsung Galazy S III Can Listen Even While Sleeping", Mashable, May 29, 2012, pp. 1-14.
U.S. Appl. No. 14/621,093, filed Feb. 12, 2015, Manu Gulati.
First Action Interview Pilot Program Pre-Interview Communication, U.S. Appl. No. 14/621,093, filed Feb. 12, 2015, dated May 9, 2016, 6 pages.
Taiwan Office Action, Application No. 103134923, dated Jan. 25, 2016, 12 pages.
AU Patent Application No. 2014349166, IP Australia, Patent Examination Report No. 1, dated Oct. 19, 2016, 5 pages.
International Preliminary Report on Patentability and Written Opinion in application No. PCT/US2014/057958 dated May 26, 2016, 9 pages.
Office Action, Chinese Patent Office, Chinese Application for Invention No. 201480061595.X, dated Mar. 13, 2018, 19 pages.
Notice of Preliminary Rejection (non-final), Korean Intellectual Property Office, Korean Patent Application No. 10-2016-7013515, dated Mar. 17, 2017, 7 pages.

\* cited by examiner

ALWAYS-ON AUDIO CONTROL FOR MOBILE DEVICE

This application claims benefit of priority to U.S. Provisional Patent Application Ser. No. 61/903,002, filed on Nov. 12, 2013. The above application is incorporated herein by reference in its entirety. To the extent that material in the above application conflicts with material expressly set forth herein, the material expressly set forth herein controls.

BACKGROUND

Field of the Invention

This invention is related to the field of mobile devices and, more particularly, to voice/audio control of mobile devices.

Description of the Related Art

Mobile devices have become ubiquitous. Mobile devices may include any electronic device that is designed to operate on portable power (e.g. a battery) and to be easily carried by a user. Mobile devices may include cell phones, "smart" phones, personal digital assistants (PDAs) such as the iTouch™, entertainment devices such as the iPod™ and MP3 players, laptop computers, net top computers, tablet devices such as the iPad™ and Windows® based tablets, etc. Most of these devices include wireless connectivity (e.g. WiFi, cell connection, etc.) and thus can be used as an information source in addition to providing various local applications that can be run on the device directly.

Mobile devices can be controlled through a user interface such as a touch screen, a keyboard that is part of the device or connected to the device, various pointing devices (e.g. mice, touchpads, etc.), etc. More recently, voice control has started to become more common. For example, some of Apple's i-devices (iPhone™, iPad™, etc.) have adopted voice control via the Siri application. The user can pick up the device, press and hold a button, and wait for Siri to respond. When Ski responds, the user can verbally ask a question or provide a command, which Siri will interpret and attempt to satisfy. The act of holding down the button until Siri responds serves to wake up the device (if it is in an idle state), initialize the operating system, and activate the Siri application so that it is ready to accept input.

Some mobile devices have begun to implement a limited voice command activation function when the device is idle. A device can be idle if it appears to the user to be "off" (even though the user knows the device is on because it may accept an electronic communication such as an email, a phone call, or a text message). The idle device generally does not have the display screen turned on, and many internal components can be powered down and need to be initialized for full function of the device. In mobile devices with the limited voice command activation function, the user may say a key word or phrase to cause the device to turn "on" and accept further voice control. For example, one such phrase is "hey google now" used for Android smart phones.

With the limited command activation, the user must pause after uttering the key phrase and await a visual and/or audio indication that the device is ready for further input. While the device is idle, the device has a microphone turned on and is listening with a discrete digital signal processor (DSP) for the key word/phrase. Once the key word/phrase has been recognized, the DSP may signal the rest of the device to initialize (or boot) and then respond to the user when ready. The delay between uttering the key word/phrase and then the desired question/command makes the interface unwieldy. Therefore, the limited command activation is only a small improvement over picking up the device and pressing/holding the button as described above.

SUMMARY

In an embodiment, an integrated circuit (e.g. a system on a chip, or SOC), may include one or more central processing units (CPUs), a memory controller, and a circuit configured to remain powered on when the rest of the SOC is powered down. The circuit may be configured to receive audio samples corresponding to sound sensed by a microphone, and further configured to match those audio samples against a predetermined pattern to detect a possible command from a user of the device that includes the SOC. The predetermined pattern may represent the user's voice uttering a key word or phrase, for example. In response to detecting the predetermined pattern in the samples, the circuit may cause the memory controller to power up so that audio samples may be stored in the memory to which the memory controller is coupled. The circuit may be configured to continue buffering samples until the memory controller is initialized, and then may write the samples to memory. The circuit may also cause the CPUs to be powered on and initialized, and the operating system (OS) may boot. During the time that the CPUs are initializing and the OS is booting, the circuit and the memory may be capturing the audio samples. The OS (or an application running on the OS) may process the samples from memory to determine the command/request.

In an embodiment, the capturing of the samples in memory may permit the capture of samples that would otherwise have gone unrecorded. Thus, a user may speak the desired command/question without waiting for the device to indicate that it is ready for input, and the command/question may be processed accurately by the software executing on the CPUs. The interface to the device may thus be simpler and more natural, and thus users may be more inclined to use the voice command features of the device.

BRIEF DESCRIPTION OF THE DRAWINGS

The following detailed description makes reference to the accompanying drawings, which are now briefly described.

Figure 1:
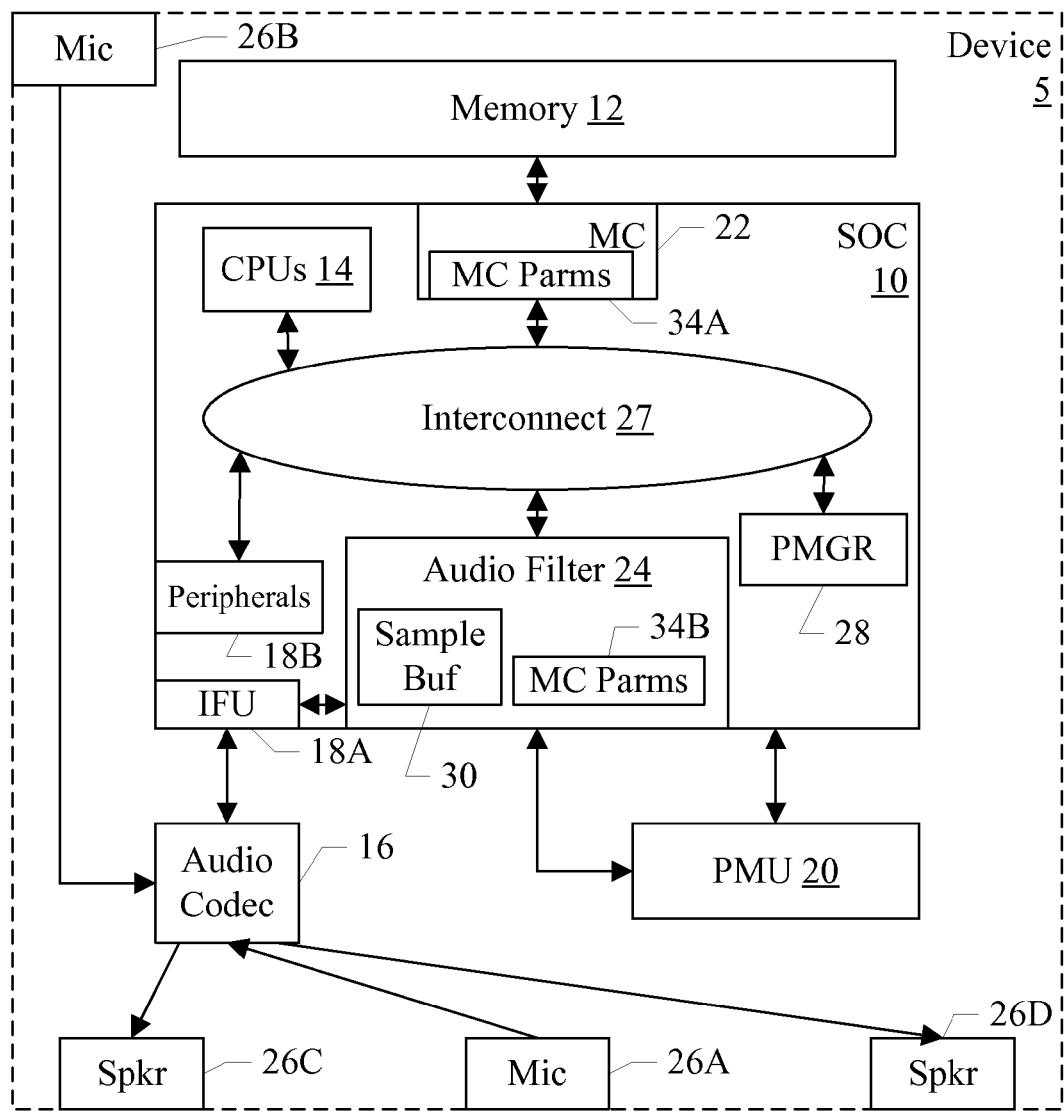
FIG. 1 is a block diagram of one embodiment of a device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a device 5 is shown. In the illustrated embodiment, the device 5 may include an integrated circuit (IC) 10, which may be an SOC in this example. The SOC 10 may be coupled to a memory 12, an external audio coder/decoder (codec) 16, and a power management unit (PMU) 20. The audio codec 16 may be coupled to one or more audio sensors, collectively referred to as sensors 26. For example, the audio codec 16 may be coupled to one or more microphones (mic) 26A-26B and one or more speakers (spkr) 26C-26D.

As implied by the name, the components of the SOC 10 may be integrated onto a single semiconductor substrate as an integrated circuit "chip." In some embodiments, the components may be implemented on two or more discrete chips in a system. Additionally, various components may be integrated on any integrated circuit (i.e. it need not be an SOC). However, the SOC 10 will be used as an example herein. In the illustrated embodiment, the components of the SOC 10 include a central processing unit (CPU) complex 14, peripheral components 18A-18B (more briefly, "peripherals"), a memory controller 22, an audio filter circuit 24, a power manager circuit (PMGR) 28, and a communication fabric 27. The components 14, 18A-18B, 22, 24, and 28 may all be coupled to the communication fabric 27. The memory controller 22 may be coupled to the memory 12 during use. Similarly, the peripheral 18A may be an interface unit (IFU) coupled to the audio codec 16 during use, which is further coupled to the audio sensors 26 during use.

The device 5 may be any type of portable electronic device, such as a cell phone, a smart phone, a PDA, a laptop computer, a net top computer, a tablet device, an entertainment device, etc. In some embodiments, the device 5 may be a non-portable electronic device such as a desktop computer as well. Such non-portable devices may also benefit from the audio device control features described herein.

During times that the device 5 is idle, portions of the SOC 10 may be powered down. Particularly, the CPU complex 14, the memory controller 22, the peripheral 18B, the interconnect 27, and a portion of the PMGR 28 may be powered down. If the device 5 is idle but not completely powered down, on the other hand, the audio filter circuit 24 may remain powered, as may the IFU 18A. Components external to the SOC 10 may be powered up or down as desired when the device 5 is idle. Particularly, the memory 12 may remain powered and thus capable of retaining the data stored therein. In an embodiment in which the memory 12 is a DRAM of one of various types, the memory 12 may be placed in self-refresh mode to retain the stored data during times that the device 5 is idle.

During the idle time, the audio filter circuit 24 may be configured to receive audio samples from the audio codec 16, through the IFU 18A and may attempt to detect a predetermined pattern in the samples (e.g. the key word/phrase to wake up the device 5 in order to service a command or request uttered by the user). The predetermined pattern may be programmed into the audio filter circuit 24 or may be hard coded in the audio filter circuit 24. In an embodiment, the predetermined pattern may be captured from the user verbally uttering the key word/phrase, training the device 5 to the user's particular voice. In another embodiment, the predetermined pattern is a generic pattern that represents the key word/phrase as spoken with a variety of inflections, tones, etc.

In response to detecting the pattern, the audio filter 24 may be configured to cause the memory controller to be powered up and initialized (so that the matching samples and following samples may be stored in memory) and may also be configured to cause the CPU complex 14 to be powered up to boot the operating system (and potentially other portions of the SOC 10, depending on the implementation). In an embodiment, the memory controller 22 may power up relatively quickly. A phase locked loop for the memory controller 22 may be locked, and the memory controller 22 may be initialized, with a fairly predictable delay that is shorter than the booting up of the operating system. The interconnect 27 may be powered up as well so that the audio filter circuit 24 may transmit the parameters mentioned below and write memory operations to write the samples to the memory 12. The audio filter circuit 24 may include a sample buffer 30, and the audio filter circuit 24 may be configured to temporarily buffer samples in the sample buffer 30 for comparison to the predetermined pattern and, once the pattern is detected, to further buffer samples until the memory controller 22 is ready to receive writes to the memory 12. Thus, the size of the sample buffer 30 may be based on the delay from detecting the pattern until the memory controller 22 is ready. In some embodiments, the sample buffer 30 may be sized to permit buffering of the samples that match the predetermined pattern, the subsequently-received samples based on the delay until the memory controller is ready, and one or more samples prior to the samples that matched the predetermined pattern (i.e. the key word/phrase/sound). The prior samples may be processed to determine the background noise being captured by the microphone, which may aid the more accurate processing of the subsequent samples.

In some embodiments, the memory controller 22 may support advanced DRAM technologies which involve training the memory controller 22 and the memory 12 to properly sync on the links between them. The parameters of the memory controller 22 configuration may be programmed into the memory controller 22, either directly by hardware via the training or by software (reference numeral 34A). To more rapidly restore the memory controller 22 to operation from the audio filter circuit 24, the audio filter circuit 24 may shadow the parameters (reference numeral 34B). Alternatively, the parameters 34B may be a conservative set of parameters that are known to work properly across all versions of the DRAMs and all operating conditions in the device 5. The audio filter circuit 24 may transfer the parameters 34B to the memory controller 22 to ensure that the memory controller is prepare to write the memory 12.

The CPUs may begin execution of the operating system, and may determine that the reason the SOC 10 is reactivating is that the audio filter 24 detected the key word/phrase. The CPUs may read the samples from the memory 12, and may verify that the key word/phrase is indeed detected. For example, in some embodiments, the audio filter 24 may use a simpler and coarser-grained (less accurate) matching process than may be supported by the code executed by the CPUs. The CPUs may verify that the code is detected, and may proceed to process the rest of the received audio samples to determine the command/request that was spoken after the key word/phrase.

In another embodiment, the CPU complex 14 may not be awakened in parallel with the memory controller 22. For example, in some embodiments, the audio filter circuit 24 may be configured to perform the processing of the subsequent samples (but may power up the memory controller 22 to avail itself of the space in the memory 12 to store samples). In another embodiment, the audio filter circuit 24 may also be configured to perform other operations when the device 5 is idle, and the audio filter circuit 24 may use the memory 12 for storage for some of the operations. In such embodiments, the memory controller 22 may be powered up without powering up the CPU complex 14.

Powering up various components of the SOC 10 may include communication with the PMU 20. In an embodiment, the audio filter circuit 24 may be configured to communicate with the PMU 20 to cause the power up the other SOC circuit sections. Alternatively, on chip power gating may be implemented to power up/power down various components of the SOC 10. The internal PMGR 28 may be configured to implement the on chip power gating and the audio filter circuit 24 may be configured to communicate with the PMGR 28 to cause the power up. In still other embodiments, a combination of the PMGR 28 and the PMU 20 may be used. In yet another embodiment, the PMGR 28 may be configured to communicate with the PMU 20 and audio filter circuit 24 may communicate power up requests to the PMGR 28, which may communicate with the PMU 20 as needed.

Between the sample buffer 30 and the memory 12, there may be little to no sample loss in the audio data from the microphone(s) 26A-26B. Accordingly, the user may speak the key work/phrase and continue without any required hesitation to speak the request/command.

In various embodiments, the audio filter circuit 24 may include any combination of fixed hardware and/or one or more processors that execute software. The software may be firmware included in the audio filter circuit 24 (e.g. stored in a non-volatile memory in the audio filter circuit 24). Alternatively, the firmware may be included in other non-volatile storage in the device 5 to be accessible for execution. If a fixed hardware implementation is used, the sample pattern may still be programmable as an input to the fixed hardware. Such programmability may allow different key words/ phrases/sounds to be used, for multiple languages to be supported, etc. Implementing a fixed hardware audio filter circuit 24 may provide a more power-efficient solution to monitoring the audio samples than a processor executing software may provide.

It is noted that, while the description here may refer to a key word or phrase that may be used to activate the command mode, in general any sound may be used in various embodiments (e.g. a whistle, a hand clap, a non-verbal orally-generated sound, etc.).

As used herein, the term "power up" may refer to applying power to a circuit that is currently powered down (or powered off). In some embodiments, a given circuit may support more than one power state (e.g. voltage and frequency combinations). Powering up may refer to establishing any of the power states supported by the circuit. Powering up may also be referred to as powering on. The term "power down" or "power off" may refer to reducing the power supply voltage magnitude to zero volts.

The audio codec 16 may be a general coder/decoder of audio data. The codec may include analog to digital converters configured to convert the signals received from the microphones 26A-26B into digital samples that may be transmitted to the SOC 10. The codec may include digital to analog converters configured to receive digital audio data from the SOC 10 and to convert the digital audio data to an analog signal to be played on the speakers. In an embodiment, the audio codec 16 may support one or more low power modes which may be used during times that the device 5 is idle. For example, the audio codec 16 may reduce the number of microphones that are open (or "on"), and may turn off the speakers. In some embodiments, the audio sample rate may be decreased in the low power mode.

The CPU complex 14 may include one or more processors that serve as the CPU of the SOC 10. The CPU of the system includes the processor(s) that execute the main control software of the system, such as an operating system. Generally, software executed by the CPU during use may control the other components of the device 5/SOC 10 to realize the desired functionality of the device 5. The CPU processors may also execute other software, such as application programs. The application programs may provide user functionality, and may rely on the operating system for lower level device control. Accordingly, the CPU processors may also be referred to as application processors. The CPU complex may further include other hardware such as an level 2 (L2) cache and/or and interface to the other components of the system (e.g. an interface to the communication fabric 27).

The peripherals 18A-18B may be any set of additional hardware functionality included in the SOC 10. More particularly, the peripheral 18A may be an interface unit configured to couple to the audio codec 16. Any interface may be used (e.g. the serial peripheral interface (SPI), serial or parallel ports, a proprietary interface for the audio codec 16, etc.). The peripheral 18B may include video peripherals such as video encoder/decoders, scalers, rotators, blenders, graphics processing units, display controllers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory requests from the other components of the SOC 10 and for accessing the memory 12 to complete the memory requests. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). In some embodiments, the memory 12 may be packaged separate from the SOC 10 (e.g. in a single inline memory module (SIMM), a dual inline memory module (DIMM) or one or more DRAM chips mounted to a circuit board to which the SOC 10 is mounted). In other embodiments, the memory 12 may be packaged with the SOC 10 (e.g. in a package-on-package or chip-on-chip configuration).

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

As mentioned above, the power manager 28 may manage internal power sequencing within the SOC 10. The power manager 28 may be configured to establish various power/performance states in various components within the SOC 10 to balance computational demands and power consumption in the device 5. The power manager 28 may be programmable with the desired power/performance states and may manage the power on/off and clock frequency setting of the various components based on the programmed states.

The PMU 20 may generally be responsible for supplying power to the components of the device 5, including the SOC 10, the audio codec 16, the peripherals 26A-26D, and the memory 12. The PMU 20 may be coupled to receive voltage magnitude requests from at least some of the components (e.g. the SOC 10) and may include voltage regulators configured to supply the requested voltages. The SOC 10 may receive multiple voltages (e.g. a CPU voltage for the CPU complex 14, a memory voltage for memory arrays in the SOC 10 such as caches, an SOC voltage or voltages for other components of the SOC, etc.).

The microphones 26A-26B may be any device capable of receiving sound and providing an output signal that represents the received sound. In some cases, more than one microphone may be desirable. For example, in a smart phone with video capability, in may be desirable to include a microphone near where the user's mouth would be when making a voice call, as well as one near the video camera for capturing sound from the subject being filmed. Any number of microphones may be included in various embodiments, and any number of the included microphones may be open when the device 5 is idle.

The speakers 26C-26D may be any device capable of receiving an input signal and generating sound represented by the signal. In some cases, more than one speaker may be desirable. For example, multiple speakers may permit stereo-type sound effects, and multiple speakers may permit sound production to be optimized based on the orientation of the device. Any number of speakers may be included in various embodiments.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1. Similarly, the type and number of components external to the SOC 10 but in the device 5 may be varied, and other components not shown in FIG. 1 may be included (e.g. a display to provide a visual interface to the user, which may be a touch display, networking components, antennas, radio frequency components such as wifi or cell phone components, etc.).

Figure 2:
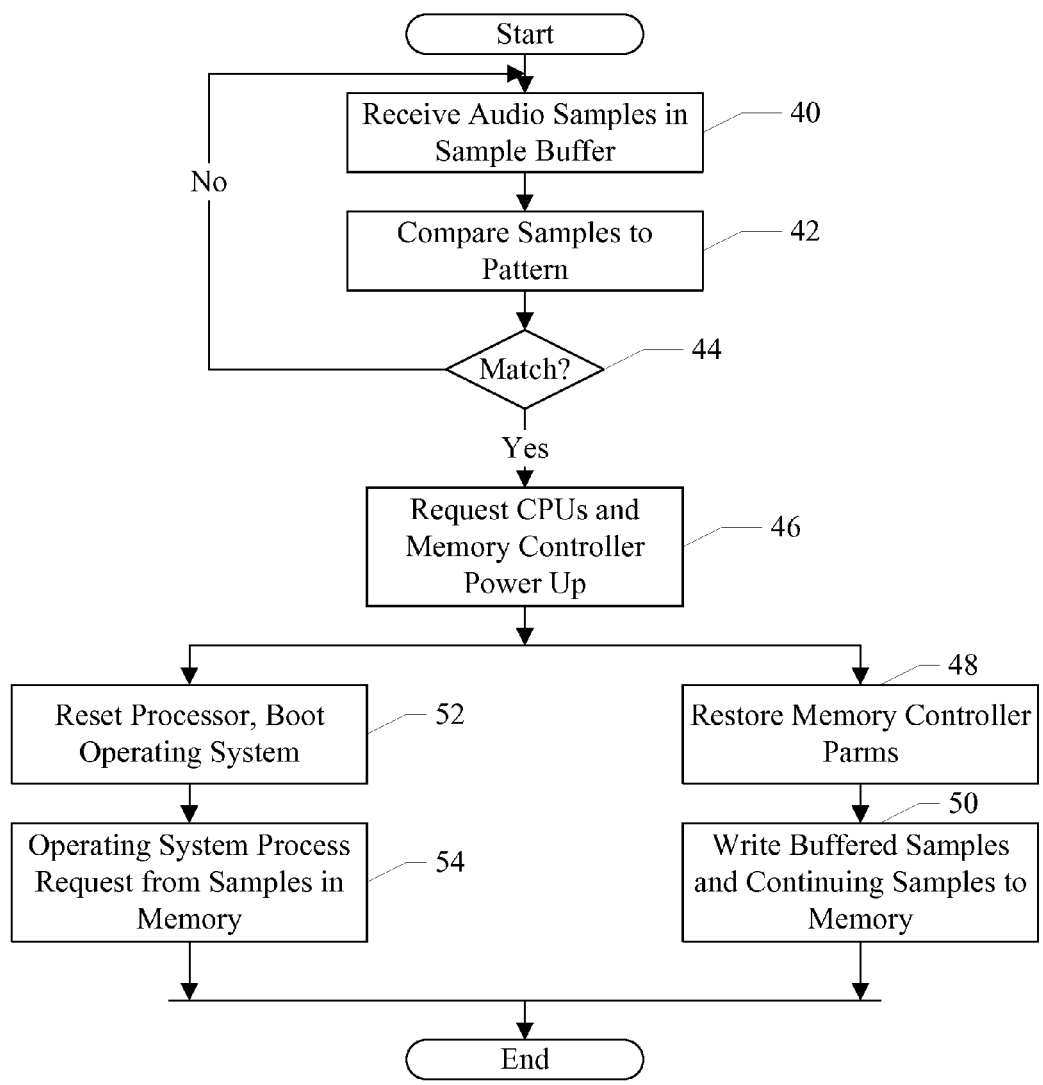
FIG. 2 is a flowchart illustrating operation of one embodiment of an audio filter circuit shown in FIG. 1.

Turning next to FIG. 2, a flowchart is shown illustrating operation of one embodiment of the audio filter circuit 24 and certain other parts of the device 5 during times that that the SOC 10 (or at least the CPU complex 14 and the memory controller 22) are powered down to conserve power (e.g. when the device 5 is idle). While the blocks are shown in a particular order for ease of understanding, other orders may be used. Blocks may be performed in parallel by combinatorial logic circuitry in the audio filter circuit 24 (including the blocks expressly shown in parallel in FIG. 2, and possibly other blocks). Blocks, combinations of blocks, and/or the flowchart as a whole may be pipelined over multiple clock cycles. Blocks may be implemented by a processor executing software in some embodiments, or the blocks may be fixed hardware, or any combination thereof. The audio filter circuit 24 may be configured to implement the operation shown in FIG. 2.

The audio filter circuit 24 may receive one or more audio samples from the audio codec 16 into the sample buffer 30 (block 40) and may compare the samples to the predetermined pattern that is used as the key word/phrase/sound to activate the voice command mode in the device 5 (block 42). If there is not a match (decision block 44, "no" leg), the audio filter circuit 24 may continue receiving samples into the sample buffer 30 and comparing the samples. The sample buffer 30 may overwrite the oldest samples with new samples once the sample buffer 30 is full. That is, a sample buffer 30 having N entries for samples (where N is a positive integer) may have the most recent N samples at any given point in time.

Responsive to detecting a match (decision block 44, "yes" leg), the audio filter circuit 24 may be configured to request that the CPU complex 14 and the memory controller 22 be powered up (block 46). The request may be transmitted to the PMU 20, the PMGR 28, or a combination of the two depending on the implementation. As mentioned previously, in other embodiments, only the memory controller 22 may be powered up. Alternatively, the memory controller 22 may be powered up first, and the CPU complex 14 may be powered up subsequently. Such a staggered power up may be used in cases in which powering up the memory controller 22 (and the fabric 27) in parallel with the CPU complex 14 may have the potential to exceed the allowable amount of current during the power up (the so-called "inrush current").

The memory controller 22 may be powered up, and the memory controller parameters 34B from the audio filter circuit 24 may be restored to the parameters 34A in the memory controller 22 (block 48). The parameters may be "restored" if the parameters 34B are a shadow of the most recent parameters 34A that were in use in the memory controller 22 (prior to powering down the memory controller 22). As mentioned above, in another embodiments, the parameters 34B may be a set of conservative "known good" parameters that will successfully permit access to the memory 12 but may not be optimized for maximum performance. In this case, "restoring" the parameters may refer to establishing the conservative parameters 34B as the parameters 34A. Subsequently, the memory controller 22 may be trained to the memory 12 and the parameters may be modified. The audio filter circuit 24 may write the matching samples and subsequent samples from the sample buffer 30 to the memory 12 through the memory controller 22, and may continue writing the samples until operation is terminated by the CPU complex 14, in an embodiment (block 50).

Additionally, the processors in the CPU complex 14 may boot into the operating system after being powered up and reset (block 52). The operating system, executing on the CPU complex 14, may process the samples stored in the memory 12 to verify that the key word/phrase/sound was indeed detected and to determine what the user's request is. The device 5 may attempt to perform the command/request (block 54).

Booting the operating system may include testing and programming the various components of the SOC 10, and may be a time-consuming task as compared to powering up and restoring the memory controller 22. The operating system may be designed to check if the reason for booting is due to detection of the key word/phrase/sound early in the process of booting, and may process at least the samples the represent the key word/phrase/sound to verify the detection. If the operating system determines that the detection by the audio filter circuit 24 was false, the operating system may cease the booting process and return the device 5 to an idle state (powering off the CPU complex 14 and the memory controller 22).

Figure 3:
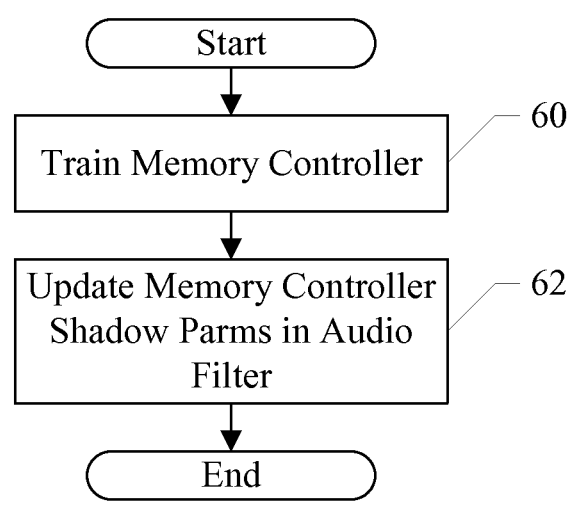
FIG. 3 is a flowchart illustrating one embodiment of initialization of the memory controller and the audio filter circuit.

FIG. 3 is a flowchart illustrating operation of one embodiment of the operating system to train the memory controller 22 and to provide shadow memory controller parameters to the audio filter circuit 24. While the blocks are shown in a particular order for ease of understanding, other orders may be used. Blocks may be implemented by a processor executing operating system software in some embodiments, as mentioned above.

The operating system may activate training in the memory controller 22, causing the memory controller 22 to sync with the memory 12 and establish a high performance connection to the memory 12 (block 60). Responsive to training completion, the parameters 34A may represent the configuration. The operating system may copy the parameters 34A to the shadow parameters 34B (block 62). Alternatively, the shadowing may be implemented in hardware. In yet another embodiment, a different set of parameters may be provided to the shadow parameters 34B, to ensure that the memory controller 22 may operate properly when restored due to detection of the key word/phrase/sound.

Figure 4:
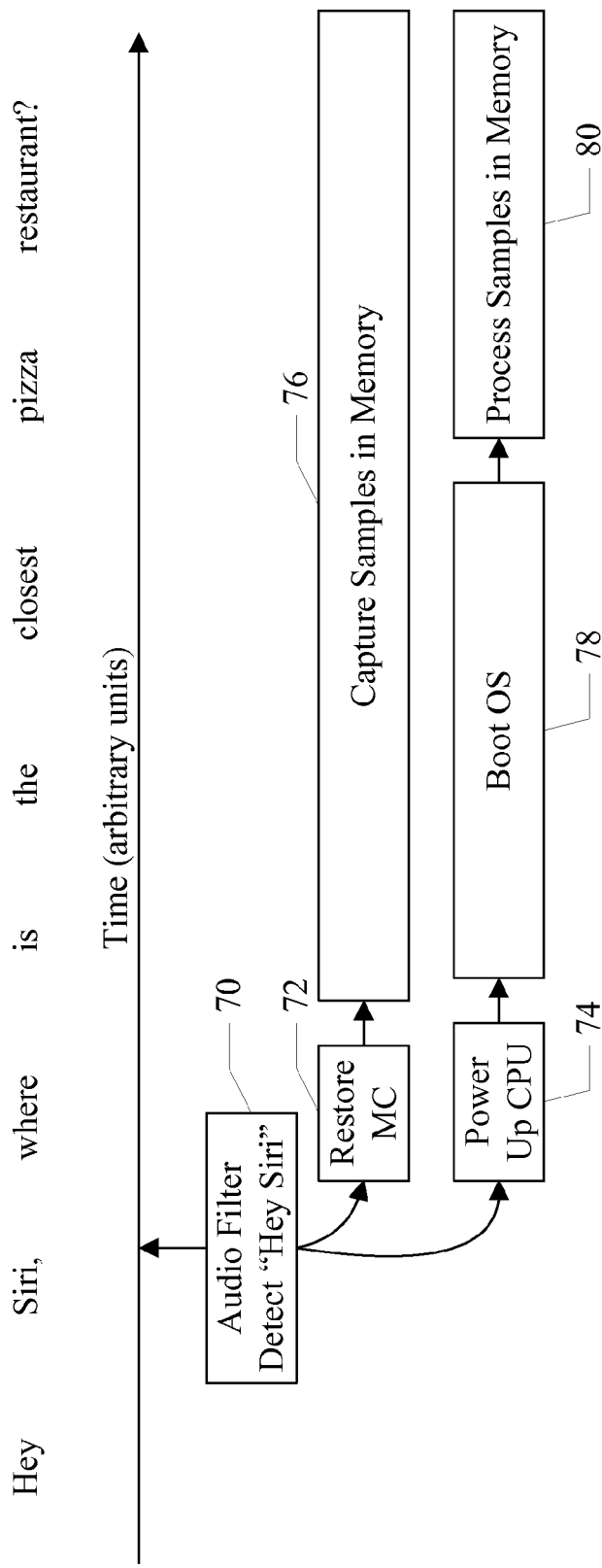
FIG. 4 is a timing diagram illustrating operation of one embodiment of the device shown in FIG. 1.

Turning now to FIG. 4, a timing diagram is shown illustrating operation of one embodiment of the device 5. Time increases from left to right in FIG. 4. At the beginning of the timing diagram, on the left, the device 5 may be idle and thus the audio filter circuit 24 may be monitoring the audio samples. Other portions of the SOC 10, such as the memory controller 22 and the CPU complex 14, may be powered down. The sentence across the top of the timing diagram may be uttered by the user, and in this example the key phrase may be "Hey Siri." However, any key word/phrase may be used in various embodiments.

As the audio samples generated in response to the microphone are processed by the audio filter 24, the audio filter 24 may detect the key phrase (reference numeral 70). Responsive to the detection, the audio filter 24 may request power up of the memory controller 22 and the CPU complex 14 (reference numerals 72 and 74). The audio filter 24 may restore the memory controller 22 from the parameters 34B, so that the memory controller 22 may become available to accept write operations. Subsequently, the audio filter 24 may write the audio samples that matched the pattern, and the subsequent samples (representing "where is the closest pizza restaurant?"), to memory (reference numeral 76).

Meanwhile, the CPU may power up, reset, and boot the operating system (reference numerals 74 and 78). As illustrated in FIG. 4, the booting of the operating system, to the point at which the audio sample processing may begin (reference numeral 80), may take longer than the restoration of the memory controller 22. The samples that are received and captured by the memory controller, e.g. the word or words immediately following the key word, would not be captured if only the operating system were capturing the words after boot. Thus, continuous speaking by the user may be captured and a more natural (to the user) interface may be available. As mentioned previously, in some embodiments, the CPU may not power up in parallel with the memory controller 22.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
  one or more processors;
  at least one memory controller; and
  a first circuit coupled to the one or more processors and to the memory controller, wherein the first circuit is configured to remain powered up during times that the one or more processors and the memory controller are powered down, and wherein the first circuit is configured to receive audio samples captured by one or more audio input devices and to detect a predetermined pattern in the audio samples during a time that the one or more processors and the memory controller are powered down, and wherein the first circuit is configured to cause the memory controller and the one or more processors to power up responsive to detecting the predetermined pattern, and wherein the first circuit is configured to write the audio samples that match the predetermined pattern and subsequently-received samples to memory through the memory controller subsequent to powering up the memory controller in response to detecting the predetermined pattern, including writing audio samples to the memory through the memory controller during a time:
    (1) after the memory controller and the one or more processors are powered up but the one or more processors are still booting an operating system;
    (2) the memory controller is available to accept write operations; and
    (3) prior to the one or more processors being ready to operate on the audio samples,
  whereby the audio samples that match the predetermined pattern are available in the memory for the one or more processors to verify the match subsequent to powering up responsive to the first circuit detecting the match; and
  wherein the first circuit comprises a buffer configured to store a plurality of the audio samples, wherein a number of the plurality of audio samples is sufficient to store the audio samples that match the predetermined pattern and the subsequently-received samples until the memory controller is available to receive writes of the audio samples to the memory.

2. The integrated circuit as recited in claim 1 wherein the predetermined pattern represents sound comprising a verbal utterance of one or more words.

3. The integrated circuit as recited in claim 2 wherein the predetermined pattern is captured from a user's voice.

4. The integrated circuit as recited in claim 1 wherein the predetermined pattern represents a non-verbal sound.

5. The integrated circuit as recited in claim 1 wherein the first circuit is configured to provide one or more memory controller parameters to the memory controller to program the memory controller for operation with the memory.

6. The integrated circuit as recited in claim 1 wherein the first circuit comprises a processor configured to execute a plurality of instructions to perform at least the detecting of the predetermined pattern in the audio samples and causing the power up of the processors and the memory controller.

7. The integrated circuit as recited in claim 1 wherein the first circuit comprises hardware circuitry configured to detect the predetermined pattern in the audio samples.

8. A system comprising:
an audio input device;
an audio coder/decoder (codec) coupled to the audio input device and configured to generate audio samples from sound detected by the audio input device;
a memory; and
an integrated circuit coupled to the audio codec and the memory, wherein the integrated circuit includes an audio filter, one or more processors, and a memory controller coupled to the memory, and wherein the audio filter is configured to detect a predetermined pattern in the audio samples from the audio codec during a time that the memory controller and the one more processors are powered down and is configured to cause the memory controller and the one or more processors to power up responsive to detecting the predetermined pattern, wherein the integrated circuit is configured to buffer the audio samples that match the pattern and subsequently-received audio samples until the memory controller is able to accept write operations to write the samples to the memory, and wherein the audio filter is configured to transmit write operations to the memory controller to write audio samples to memory, including during a time:
(1) after the memory controller and the one or more processors are powered up but the one or more processors are still booting an operating system;
(2) the memory controller is available to accept write operations; and
(3) prior to the one or more processors being ready to operate on the audio samples,
whereby the audio samples that match the pattern are available in the memory for the one or more processors to verify the match subsequent to powering up responsive to the audio filter detecting the match; and
wherein the audio filter comprises a buffer configured to store a plurality of the audio samples, wherein a number of the plurality of audio samples is sufficient to store the audio samples that match the predetermined pattern and the subsequently-received samples until the memory controller is available to receive writes of the audio samples to the memory.

9. The system as recited in claim 8 wherein the audio filter is configured to supply a plurality of memory controller parameters to the memory controller to program the memory controller for operation, wherein the audio filter is configured to generate the write operations subsequent to programming the memory controller.

10. The system as recited in claim 8 wherein the memory is packaged with the integrated circuit.

11. The system as recited in claim 8 wherein the audio input device is one of a plurality of microphones included in the system, and wherein other ones of the plurality of microphones are disabled during times that the memory controller is powered down.

12. The system as recited in claim 8 wherein the one or more processors are configured to execute a plurality of instructions to verify that the predetermined pattern has been detected and to interpret the subsequently-received audio samples.

13. A method comprising:
powering down a central processing unit (CPU) complex and a memory controller in an integrated circuit;
during a time that the CPU complex and the memory controller are powered down, monitoring audio samples in a first circuit within the integrated circuit that remains powered;
detecting a predetermined pattern in the audio samples in the first circuit;
requesting power up of at least the memory controller in response to the detecting; and
ensuring that the audio samples and subsequently-received audio samples are not lost by buffering the audio samples and subsequently-received audio samples in the first circuit until the memory controller is available and writing the buffered audio samples to memory, including during a time:
(1) after the memory controller and the one or more processors are powered up but the one or more processors are still booting an operating system;
(2) the memory controller is available to accept write operations; and
(3) prior to the one or more processors being ready to operate,
whereby a continuous stream of audio samples are available for processing in the memory and the audio samples that match the predetermined pattern are available in the memory for the one or more processors to verify the match subsequent to powering up; and
wherein the first circuit comprises a buffer configured to store a plurality of the audio samples, wherein a number of the plurality of audio samples is sufficient to store the audio samples that match the predetermined pattern and the subsequently-received samples until the memory controller is available to receive writes of the audio samples to the memory.

14. The method as recited in claim 13 further comprising requesting power up of the CPU complex.

15. The method as recited in claim 14 further comprising:
booting an operating system on the CPU complex; and
processing the buffered audio samples from the memory.

16. The method as recited in claim 15 wherein the processing comprises:
verifying that the predetermined pattern is detected; and
interpreting the subsequently-received audio samples.

* * * * *